US008856914B2

(12) United States Patent
McGee (10) Patent No.: US 8,856,914 B2
(45) Date of Patent: *Oct. 7, 2014

(54) SYSTEM AND METHOD FOR INTELLIGENT COORDINATION OF HOST AND GUEST INTRUSION PREVENTION IN VIRTUALIZED ENVIRONMENT (71) Applicant: William Gerald McGee, Ottawa (CA)

(72) Inventor: William Gerald McGee, Ottawa (CA)

(73) Assignee: Trend Micro Incorporated, Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 13/857,074

(22) Filed: Apr. 4, 2013

(65) Prior Publication Data

US 2013/0227685 A1  Aug. 29, 2013

Related U.S. Application Data (63) Continuation of application No. 12/418,252, filed on Apr. 3, 2009, now Pat. No. 8,443,440.

(60) Provisional application No. 61/042,735, filed on Apr. 5, 2008.

(51) Int. Cl.
*G06F 21/50* (2013.01)
*G06F 21/51* (2013.01)
*G06F 21/55* (2013.01)
*H04L 29/06* (2006.01)

(52) U.S. Cl.
CPC .............. *G06F 21/50* (2013.01); *G06F 21/51* (2013.01); *G06F 21/552* (2013.01); *H04L 63/0227* (2013.01); *H04L 63/1408* (2013.01)
USPC ................... 726/13; 726/14; 726/23; 726/24; 726/25; 709/239; 709/240; 718/105

(58) Field of Classification Search
CPC ....... G06F 21/51; G06F 21/50; G06F 21/552; H04L 63/1408; H04L 63/0227
USPC ..................... 726/1, 11–14, 22–25; 709/224, 709/239–240; 718/1, 100, 105
See application file for complete search history.

(56) References Cited

U.S. PATENT DOCUMENTS 6,147,976 A * 11/2000 Shand et al. ................... 370/254
6,226,680 B1 * 5/2001 Boucher et al. ............... 709/230
(Continued)

OTHER PUBLICATIONS

"Jericho Forum Commandments", published by Jericho Forum at http://www.jerichoforum.com, Dec. 2006.

(Continued)

*Primary Examiner* — David García Cervetti
*Assistant Examiner* — Shanto M Abedin
(74) *Attorney, Agent, or Firm* — IP-MEX Inc.; Victoria Donnelly (57) ABSTRACT

A distributed and coordinated security system providing intrusion-detection and intrusion-prevention for the virtual machines (VMs) in a virtual server is described. The virtualization platform of the virtual server is enhanced with networking drivers that provide a "fast path" firewall function for pre-configured guest VMs that already have dedicated deep packet inspection security agents installed. A separate security VM is deployed to provide virtual security agents providing deep packet inspection for non pre-configured guest VMs. The network drivers are then configured to intercept the data traffic of these guest VMs and route it through their corresponding virtual security agents, thus providing a "slow-path" for intrusion detection and prevention.

20 Claims, 7 Drawing Sheets

(56) References Cited

U.S. PATENT DOCUMENTS

| | | | |
|---|---|---|---|
| 7,660,265 B2 | 2/2010 | Kreuk | |
| 8,010,990 B2* | 8/2011 | Ferguson et al. | 726/1 |
| 8,166,474 B1 | 4/2012 | Delco et al. | |
| 8,190,778 B2 | 5/2012 | Shanbhogue | |
| 8,250,641 B2* | 8/2012 | Morgan et al. | 726/11 |
| 2002/0083344 A1 | 6/2002 | Vairavan | |
| 2004/0093513 A1 | 5/2004 | Cantrell et al. | |
| 2004/0143751 A1 | 7/2004 | Peikari | |
| 2004/0255157 A1* | 12/2004 | Ghanea-Hercock | 713/201 |
| 2005/0028013 A1 | 2/2005 | Cantrell et al. | |
| 2006/0031476 A1 | 2/2006 | Mathes et al. | |
| 2006/0256105 A1* | 11/2006 | Scarlata et al. | 345/418 |
| 2008/0148341 A1 | 6/2008 | Ferguson et al. | |
| 2008/0163207 A1 | 7/2008 | Reumann et al. | |
| 2008/0192740 A1 | 8/2008 | Lorusso et al. | |
| 2008/0222309 A1 | 9/2008 | Shanbhogue | |
| 2008/0320594 A1 | 12/2008 | Jiang | |
| 2009/0073895 A1 | 3/2009 | Morgan et al. | |
| 2009/0150996 A1 | 6/2009 | Haswell | |
| 2009/0328193 A1 | 12/2009 | Moore et al. | |

OTHER PUBLICATIONS

Neil MacDonald "Radically Transforming Security and Management in an Virtualized World: Concepts", published by Gartner Research, Mar. 14, 2008.

"VMware Infractructure Architecture Overview", white paper, published by VMware, Inc. at http://vmware.com, 2006.

"Vmware VMsafe Security Technology", published by VMware, Inc. at http://vmware.com, Mar. 2008.

Aaron R. Kunze et al. Symerton—using virtualization to accelerate packet processing, pp. 133-142, ACM 2006.

Takashi Okumura et al, The Netnice Packet Filter, pp. 2091-2100, IEEE 2005.

David Friedman et al, Building Firewalls with Intelligent Network Interface Cards, pp. 1-17, 2001.

Fabrizio Baiardi et al, Building Trustworthy Instrusion Detection through VM Introspection, pp. 209-214, 2007.

* cited by examiner

SYSTEM AND METHOD FOR INTELLIGENT COORDINATION OF HOST AND GUEST INTRUSION PREVENTION IN VIRTUALIZED ENVIRONMENT

RELATED APPLICATIONS

The present application is a Continuation of U.S. patent application Ser. No. 12/418,252 filed Apr. 3, 2009, which claims benefit from the U.S. Provisional Patent Application Ser. No. 61/042,735 filed Apr. 5, 2008, the entire contents of which are incorporated herein by reference

FIELD OF INVENTION

The present invention relates to computer security systems, and in particular, to system and method for intelligent coordination of host and guest intrusion prevention in virtualized environment.

BACKGROUND OF THE INVENTION

Virtualization software deployments are allowing organizations to achieve significant savings in their data centers. These savings are being gained in reduced energy and hardware costs, as well as increasing the flexibility they have in the deployment of their mission-critical applications. Deployments are often seeing 10 or more virtual machines deployed on a single physical server. The driver for virtualization deployments was initially consolidation of resources, however the benefits achieved are now causing virtualization software to fundamentally affect how mission-critical applications are designed, deployed and managed. Virtualization deployments are also causing organizations to consider which security mechanisms can improve the security posture of their physical and virtual server systems.

The ability for malware to remotely exploit software vulnerabilities is the primary threat to virtualized environments as it is with physical servers.

Figure 1:
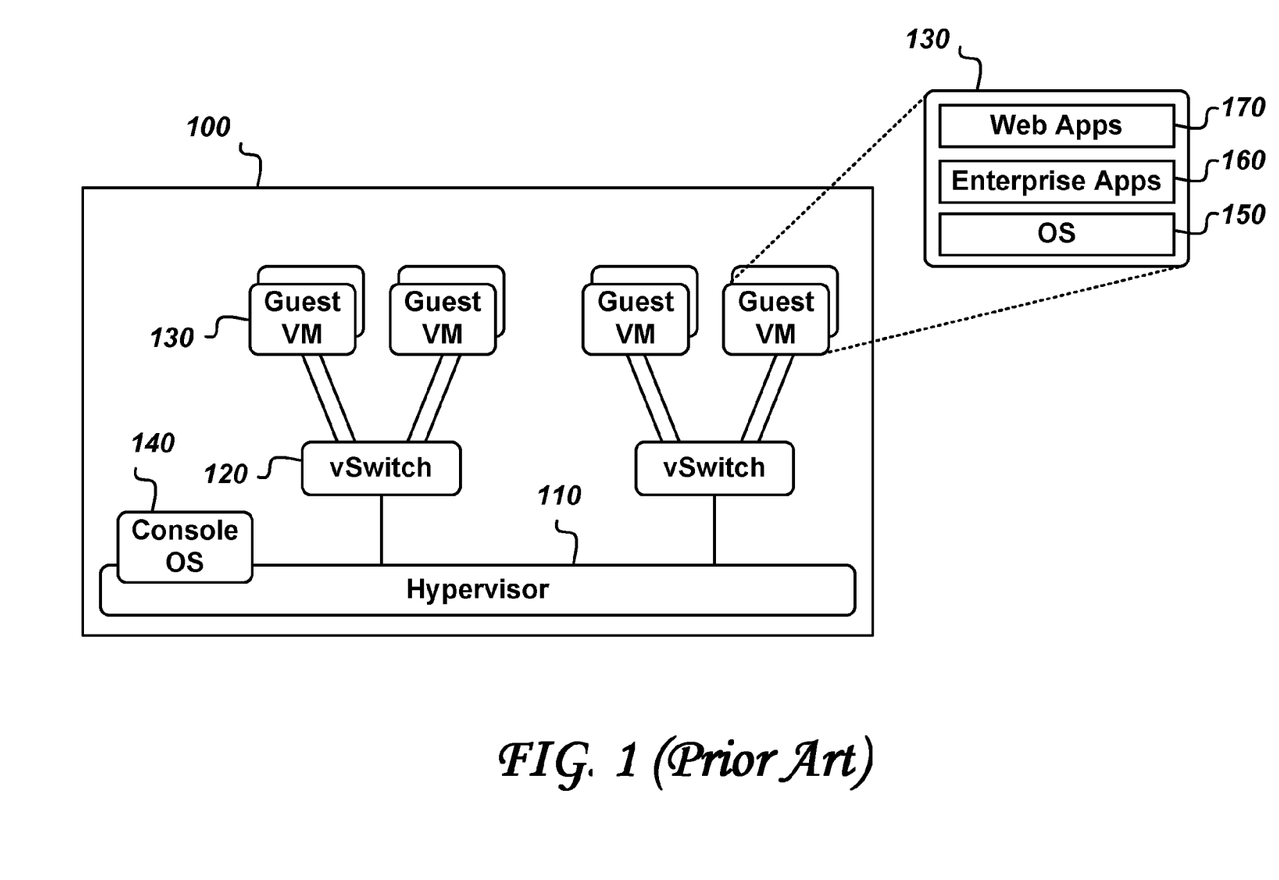
FIG. 1 illustrates a first virtual server system 100 of the prior art.

FIG. 1 illustrates a first virtual server system 100 of the prior art, including a Hypervisor 110, connected to one or more virtual switches (v-Switch) 120, each vSwitch 120 connected to one or more Guest Virtual Machines (Guest VM) 130. The Hypervisor 110 generally supports a Console Operating System (Console OS) 140. Each Guest VM 130 comprises an Operating System (OS) 150, and may include one or more Enterprise Applications 160 and one or more Web Applications 170.

In the first virtual server system 100, the Guest VMs 130 have access to computing resources such as networking resources only through the Hypervisor 110. The function of each v-Switch 120 is to isolate multiple Guest VMs 130 from each other while giving each Guest VM 130 access to the Hypervisor 110.

The primary location of the vulnerabilities are in the OS 150, the enterprise software (the Enterprise Applications 160), and the custom applications (the Web Applications 170) that may exist on the Guest VMs 130 as illustrated in FIG. 1. Other vulnerabilities may exist in the service console software (the Console OS 140) and the Hypervisor 110.

The service console is an asset which can have remotely exploitable vulnerabilities. Virtualization vendors such as Vmware, Inc. of Palo Alto, Calif., continue to work to simplify the service console. A white paper on VMware Infrastructure entitled "VMware Infrastructure Architecture Overview" was published by VMware on Jun. 5, 2006, which cited in the Information Disclosure Statement submitted by the applicant. Hypervisor vulnerabilities are not typically remotely exploitable, since the hypervisor does not have services which terminate protocols that could lead to input validation errors. Hypervisor vulnerabilities will typically be exploited from malware, which gets on to a virtual machine, i.e. on of the Guest VMs 130 and one of the best methods to protect against this is to protect against the malware getting installed there in the first place.

In protecting software vulnerabilities, virtualized environments present similar challenges for the intrusion-detection systems and intrusion-prevention systems (IDS/IPS) typically deployed in a data center, but they also present some new challenges and opportunities. It is now clear that hardware appliance based security is not sufficient to protect virtualized environments, since these devices are blind to the traffic being sent between virtual machines on a physical server. In addition, the dynamic nature of virtualized environments, with older snapshots being quickly restored and virtual machines being moved between physical servers to optimize resource use present challenges that do not exist with physical servers. The opportunity presented is that the investment in multi-processor, multi-core computing and the virtualization layer that manages it can also be leveraged to deploy the security mechanisms required to secure it.

When deciding on an approach to virtualization security, organizations can use similar security principles that have emerged in their physical environments over the last few years. One of these principles is "defence-in-depth", which is a fundamental security requirement for organizations that recognize the "de-perimeterization" that has emerged in their information technology deployments. The Jericho Forum has defined a set of commandments that should be observed when planning for a de-perimeterized future, published at "http://www.opengroup.org/jericho/commandments_v1.1.pdf".

The first fundamental of the Jericho Forum commandments is:

1. The scope and level of protection should be specific and appropriate to the asset at risk:
    Business demands that security enables business agility and is cost effective;
    Whereas boundary firewalls may continue to provide basic network protection, individual systems and data will need to be capable of protecting themselves;
    In general, it's easier to protect an asset the closer protection is provided.

Virtualization has made the challenge of de-perimeterization even more challenging. The inability of appliance based security to deal with attacks between virtual machines on the same server makes clear the need for mechanisms to be deployed on the server to protect these environments. A requirement has emerged for a virtualization security approach that allows protection of an asset to occur as close as possible to the asset itself.

There are two approaches currently being taken to protecting virtual machines with security software on the server.

Figure 2A:
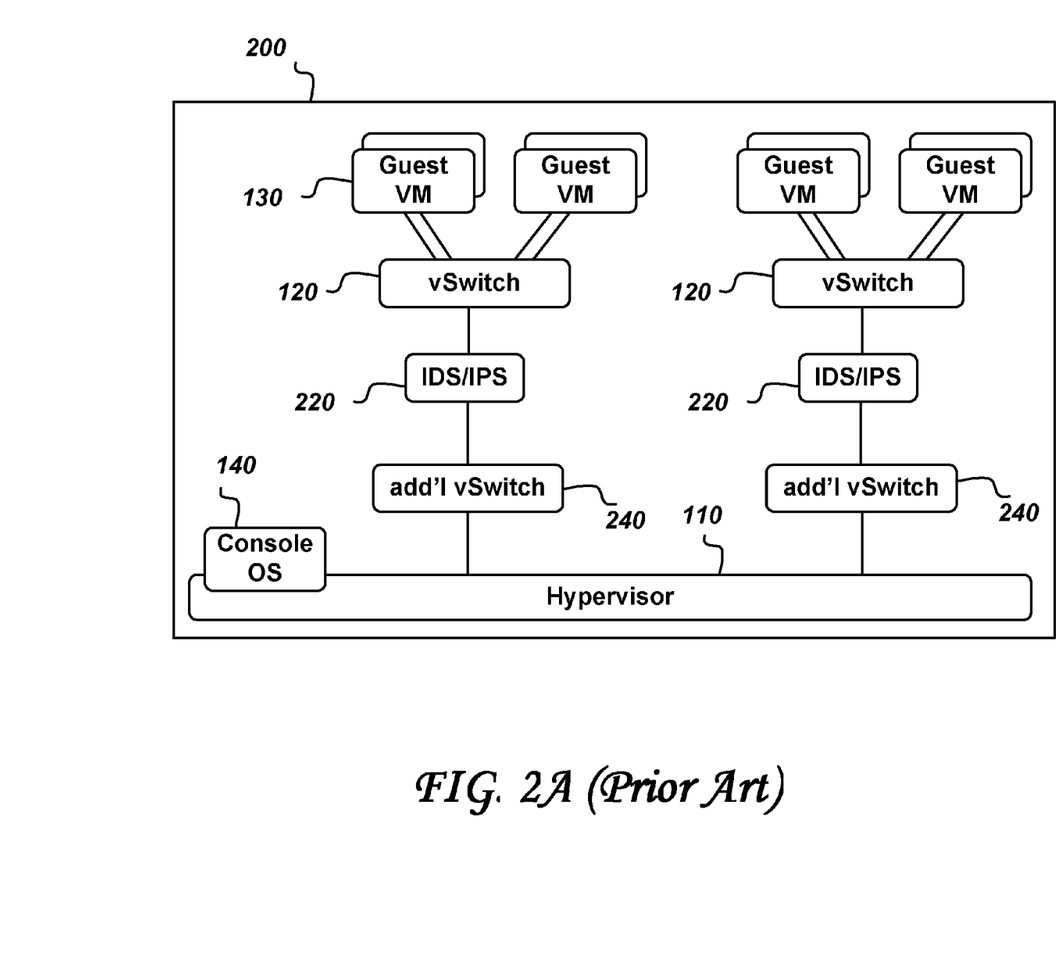
FIG. 2A illustrates a second virtual server system 200 of the prior art.

FIG. 2A illustrates a second virtual server system 200 of the prior art, in which a security overlay is provided within the virtualized environment. The second virtual server system 200 differs from the first virtual server system 100 in that IDS/IPS security appliances 220 are added within the virtualized environment and connected to the one or more Guest VMs 130 through the vSwitches 120. The IDS/IPS security appliances 220 are connected to the hypervisor 110 through additional vSwitches 240. Each of the security appliances 220 monitor the traffic flow between the respective additional vSwitch 240 and the respective vSwitch 120 and thus provide security to the Guest VMs 130 that are connected to the respective vSwitch 120.

Such security overlay solutions provide protection for Intrusion Detection System (IDS)/Intrusion Prevention System (IPS) against attacks which are coming from the network, but they have significant limitations. These limitations include:

Inter-VM traffic. The virtual appliance must be placed in front of a v-Switch 120 and therefore can not prevent attacks between virtual machines on the same v-Switch 120.

Mobility. When a virtual machine is moved from one server to another using controls like Vmotion from VMware, the security context is lost. Clustering of the security appliances must be deployed in advance to all potential destinations to which a virtual machine could be moved, with the corresponding negative performance impacts.

Non-transparent. The virtual network architecture (v-Switch) must be altered to deploy virtual appliances such as the IDS/IPS security appliances 220. This has administrative and performance impacts on the existing system.

Performance bottleneck. All traffic which is sent between virtual machines and the network must be processed by the overlay IDS/IPS. This is can be a centralized performance bottleneck, having significant CPU impact and latency impact on the data flow.

Accordingly, there is a need in the industry for further development of and improved method and system for intrusion prevention/detection in a virtualized environment, which would avoid or mitigate shortcomings of the prior art.

SUMMARY OF THE INVENTION

There is an object of the invention to provide an improved system and method for intelligent coordination of host and guest intrusion prevention in virtualized environment.

According to one aspect of the invention, there is provided a computer implemented method of intrusion-detection and intrusion-prevention for a guest virtual machine deployed on top of a virtualization platform of a virtual server system, comprising steps of:

(a) receiving a packet stream of the guest virtual machine in an associated networking driver of the virtualization platform;

(b) filtering the packet stream in a fast path processing step in the associated networking driver;

(c) determining if the guest virtual machine has a security agent installed on the guest virtual machine; and (d) filtering the packet stream in a slow path processing step performed in a virtual security agent outside of the virtual machine provided the guest virtual machine does not have the security agent.

The step (d) comprises:

(e) linking the associated networking driver to the virtual security agent;

(f) associating the virtual security agent with the guest virtual machine;

(g) intercepting the packet stream in the associated networking driver and sending it to the virtual security agent; and (h) inspecting the intercepted packet stream in the virtual security agent.

In the embodiment of the invention, the guest virtual machine may be pre-configured with the security agent. Beneficially, the virtual security agent runs in a security virtual machine. Alternatively, the virtual security agent may run in the virtualization platform.

The step (b) of the method described above comprises discarding packets whose headers contain information that matches with predetermined criteria.

Preferably, the step (h) comprises:

(i) verifying validity of a packet of the intercepted packet stream based on a checksum;

(j) verifying the packet based on layer 3 or 4 header information;

(k) performing a deep inspection of the packet; and (l) returning the packet to the associated networking driver.

The method may further comprise reassembling the packet from packet fragments in the intercepted packet stream before performing the steps (j) and (k), and fragmenting the packet into the packet fragments after performing said steps (j) and (k).

In the method described above, the step (k) comprises:

(m) buffering and re-ordering Transmission Control Protocol (TCP) segments;

(n) verifying a stateful connection sequence of the packet;

(o) verifying TCP, User Datagram Protocol (UDP), and Internet Control Message Protocol (ICMP) protocol dependent header fields;

(p) decrypting an encrypted payload of the packet;

(q) analyzing the decrypted payload to verify that it does not contain unwanted data; and (r) discarding the packet if it fails any of the verification steps (n), (o), or (q).

According to another aspect of the invention, there is provided an intrusion-detection and intrusion-prevention system in a virtual server system comprising a processor, and a computer readable storage medium having computer readable instructions stored thereon, which, when executed by the processor, form the following:

a virtualization platform including a hypervisor;

a guest virtual machine deployed on top of the virtualization platform;

a security virtual machine deployed on top of the virtualization platform; and a networking driver in the virtualization platform for linking the guest virtual machine to a network, and for intercepting data traffic of the guest virtual machine and routing it through the security virtual machine.

In the system described above, the security virtual machine comprises a virtual security agent for performing intrusion-detection and intrusion-prevention inspection on the intercepted data traffic.

Preferably, the networking driver includes a firewall.

The networking driver includes a fast path driver for bypassing the data traffic through when the guest virtual machine has a security agent, and for intercepting the data traffic otherwise.

In the embodiment of the invention, the security virtual machine comprises a plurality of virtual security agents, each security agent is associated with a respective guest virtual machine through a corresponding networking driver associated with the said guest virtual machine.

According to yet another aspect of the invention, there is provided a secure virtual server system comprising:

a processor, and a computer readable storage medium having computer readable instructions stored thereon, which, when executed by the processor, form the following:

a virtualization platform including a hypervisor;

a security virtual machine (VM); and a plurality of guest VMs;

wherein said security VM and the plurality of guest VMs are deployed on top of the virtualization platform for accessing a network through associated networking drivers for intercepting a data traffic of the guest VMs and routing it to the security VM for packet inspection.

The security VM comprises a plurality of virtual security agents, each security agent corresponding to a respective guest virtual machine, for performing intrusion-detection and intrusion-prevention inspection on the intercepted data traffic.

Each networking driver includes a firewall for filtering the data traffic.

Each networking driver includes a fast path driver for bypassing the data traffic through when a corresponding guest virtual machine has a security agent, and for intercepting the data traffic otherwise.

Preferably, the virtual security agents perform deep packet inspection of the data traffic on behalf of the respective guest virtual VMs.

A computer readable storage medium, having computer readable instructions stored thereon, which, when executed by a processor, perform the steps of the method described above, is also provided.

BRIEF DESCRIPTION OF THE DRAWINGS

The embodiments of present invention will be more fully understood from the following detailed description of the preferred embodiments that should be read in light of the accompanying drawings. These drawings should not be construed as limiting the present invention, but are intended to be exemplary only.

DESCRIPTION OF THE EMBODIMENTS OF THE INVENTION

In contrast to the prior art described in the Background section, the IDS/IPS functionality according to embodiments of the present invention is deployed in a distributed fashion.

Figure 2B:
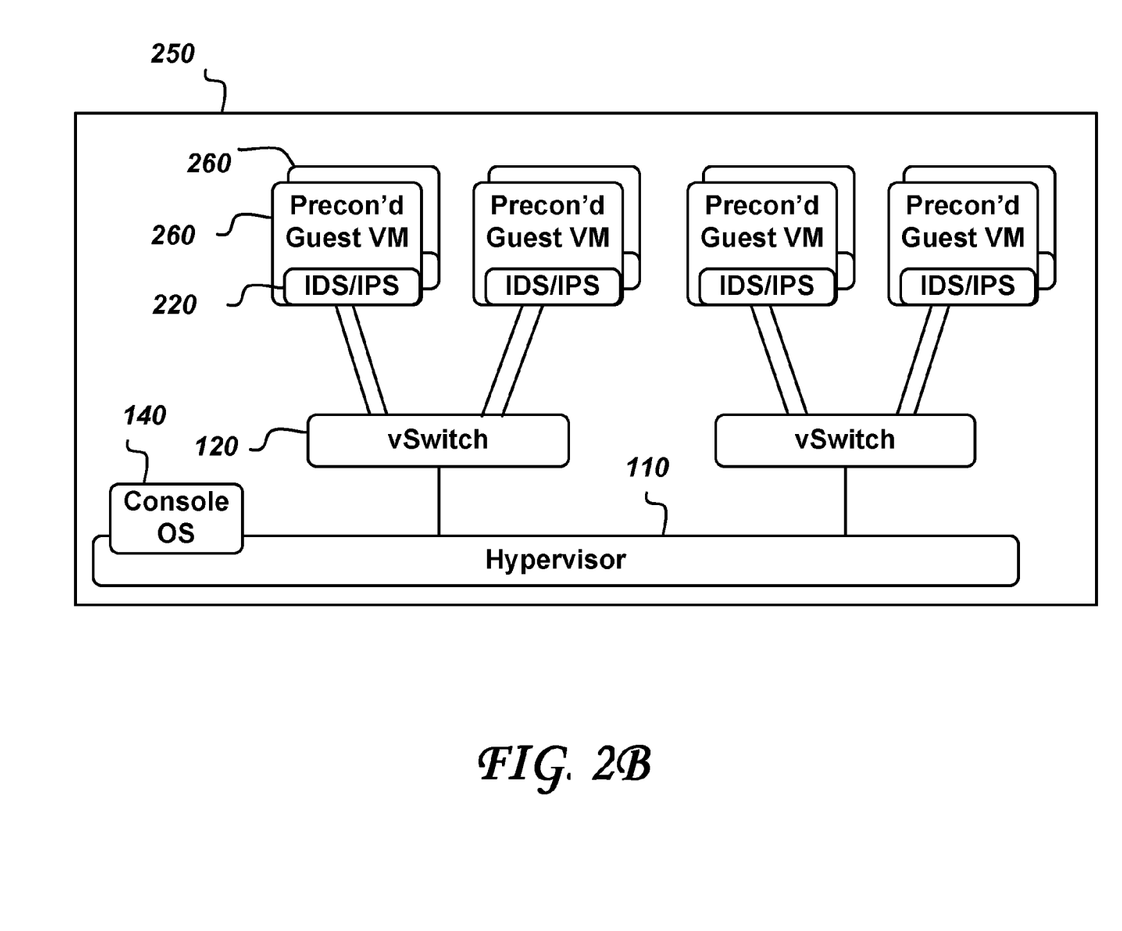
FIG. 2B illustrates a basic secure virtual server system 250 according to an embodiment of the invention.

FIG. 2B illustrates a basic secure virtual server system 250 according to an embodiment of the invention. The basic secure virtual server system 250 avoids the need for the additional vSwitches 240 of the prior art of FIG. 2A, instead, the IDS/IPS security appliances 220 are installed as components within one or more of preconfigured Guest VMs 260. The security appliances 220 monitor the traffic flow between a v-switch 120 and the respective Guest VM 130.

This approach does not have the same Inter-VM traffic, Mobility and Non-transparent limitations of the overlay IDS/IPS approach of the prior art. Its performance impact is distributed across the virtual machines, taking advantage of the virtualization software platform. The latency impact in this approach is reduced since data is being queued and inspected at a point in the virtual machine where it is already being queued. However, in order to protect the preconfigured Guest VMs 260 of the basic secure virtual server system 250, each such preconfigured Guest VMs 260 has to be configured with a copy of the IDS/IPS security appliances 220, which may be inconvenient in some cases, and may also limit the choice of operating systems and other characteristics of the guest machines to be compatible with the installation of the IDS/IPS security appliance 220.

In a second embodiment of the invention, this shortcoming of the basic secure virtual server system 250 is overcome by distributing IDS/IPS security functions in the virtualization software platform and a common security VM, as described in the following.

Figure 3:
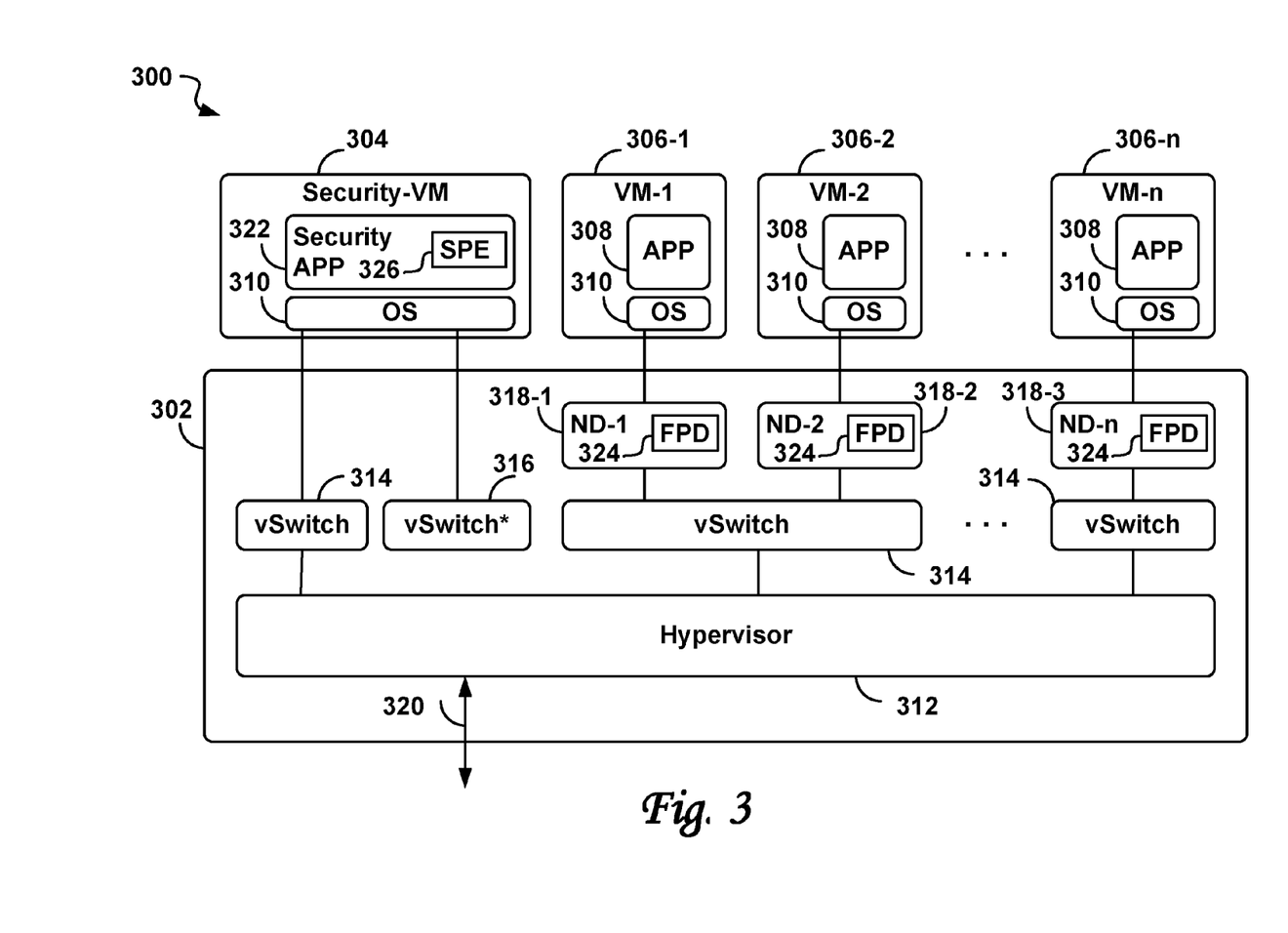
FIG. 3 illustrates a secure virtual server system 300 according to an embodiment of the invention.

FIG. 3 illustrates a secure virtual server system 300 according to the second embodiment of the invention. The secure virtual server system 300 includes a virtualization platform 302, a security virtual machine (security-VM) 304, and may include a plurality of guest virtual machines (guest VMs) 306-$i$, $i=1$ to n. Three of the guest VMs 306-$i$: a guest VM-1 306-1, a guest VM-2 306-2, and a guest VM-n 306-$n$ are shown in FIG. 3 as examples where each guest VM 306-$i$ comprises an application software (APP) 308 and an operating system (OS) 310. The structure of the guest VM 306 is simplified for the purposes of the present description only and should not be construed as a limitation. For example, the application software (APP) 308 may include a variety of softwares including web-server software, and the operating system (OS) 310 may be one of many operating systems such as Windows or Linux operating systems, limited only by capabilities of the virtualization platform 302.

The virtualization platform 302 may be based on a commercially available product such as the VMWare Infrastructure available from VMWare Inc., which includes a hypervisor (software module) 312 and vSwitch modules 314, similar to the virtual servers of the prior art, and of the basic secure virtual server 250. In addition, the virtualization platform 302 comprises a special limited version of a vSwitch, designated an internal vSwitch_prime (vSwitch*) 316, and a plurality of networking drivers 318-$ii$=1–n. Three of the networking drivers 318-$i$ are shown in FIG. 3, where each networking driver 318-$i$ is associated with a corresponding guest VM 306-$i$.

As is customary in such a virtualization architecture, each guest VM 306-$i$ is able to access an external network 320, indicated symbolically with a double pointed arrow, through the services of the hypervisor 312. In the example shown in FIG. 3, the networking drivers 318-1 and 318-2 are connected to the hypervisor 312 through one vSwitch 314, while the networking driver ND-n is connected through another vSwitch 314. In general, each vSwitch 314 may provide connectivity to one or more guest VMS 306-$i$ through their respective associated networking drivers 318-$i$. A vSwitch 314 may also provide a communication path between its subtending guest VMs; for example the guest VMs 306-1 and 306-2 may communicate with one another, as well as with the external network 320, while the guest VM 306-$n$ is only able to access the external network 320 but not the guest VMs 306-1 and 306-2 which are connected to a different vSwitch 314.

The secure virtual server system 300 according to the embodiment of the invention has the following components:
the networking drivers 318-$i$ which are interposed between the guest VMs 306-$i$ and the vSwitches 314 for the purpose of intercepting and processing data traffic of each guest VM as described in detail below; and the security-VM 304, which is a dedicated virtual machine including a security application 322.

Figure 4:
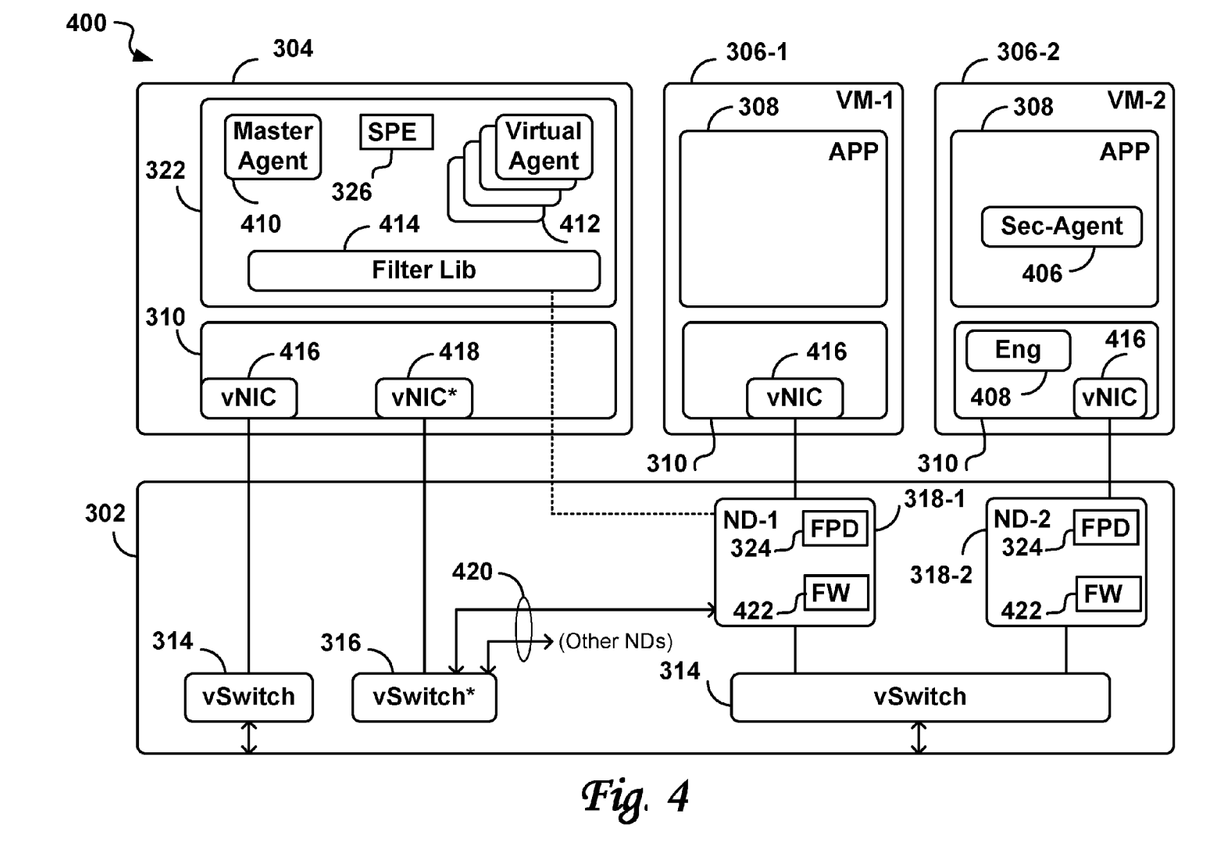
FIG. 4 illustrates a detail 400 of the secure virtual server system 300 of FIG. 3.

In the embodiments of the secure virtual server system 300, all network packets destined to, and originating from, guest VMs 318-*i* can be IDS/IPS filtered, either in the guest VMs themselves if they are preconfigured guest VMs with IDS/IPS security appliances installed as described in the basic secure virtual server of FIG. 2B, or in a coordinated manner through the security-VM 304. Filter processing is divided into fast-path drivers (FPD) 324 and a slow-path engines (SPE) 326. The fast-path drivers 324 are kernel module components that run in the virtualization platform 302, and have full control over how packets will be processed, injected, modified etc. The slow-path engines 326 are used to delegate potentially complex processing from the fast-path drivers 324 so that the slow-path engine code does not need to reside in the virtualization platform 302 itself. The slow-path engine 326 could possibly reside anywhere outside the kernel of the hypervisor 312 but the preferred approach is shown in FIGS. 3 and 4 in which it is shown bundled within the security application 322 of the security-VM 304.

The security-VM 304 is similar to a guest VM in the sense of including an operating system OS 310, and one or more applications, i.e. the Security Application 322 in this case. But it may be privileged in that is connected with special application program interface (API) hooks into the virtualization platform 302 which allows it to communicate with all guest VMs directly as well as through the internal vSwitch_prime (vSwitch*) 316 and the networking drivers 318.

The design of the security VM 304 is facilitated by a privileged access to a hypervisor API that is based on the recently developed program VMSafe of VMware, Inc. see "VMware VMsafe Security Technology" published on-line at "http://vmware.com/overview/security/vmsafe.html".

Through the use of introspection APIs, see, for example "Radically Transforming Security and Management in a Virtualized World: Concepts", Neil MacDonald, Gartner Inc, Mar. 14, 2008, ID Number: G00154794, the functions of the security VM 304 can access privileged state information about each guest VM 306, including the memory, state and network traffic. Therefore, for IDS/IPS filtering, the Inter-VM and Non-transparent limitations of the overlay IDS/IPS approach of the prior art are removed, since all network traffic within the server can be seen by the security VM 304.

FIG. 4 illustrates a detail 400 of the secure virtual server system 300, illustrating cooperation between the security-VM 304 and the guest VMs 306-1 and 306-2. In this example, the guest VM 306-1 is configured as an unmodified guest VM, and VM-2 306-2 is configured as a pre-configured VM, similar to the preconfigured guest VM 260 of FIG. 2B, which has a security agent 406 already installed in its application software 308 and a corresponding inspection engine 408 installed in its OS 310.

The Security Application 322 of the security-VM 304 includes a master agent module 410, a number of virtual security agents 412, a FilterLib software library 414, and Slow Path Engine (SPE) 326. The master agent module 410 is a template from which individual virtual security agents 412 are generated as required, to cooperate with the (unmodified) guest VMs, e.g. the guest VM 306-1.

The OS 310 of every virtual machine (VM), including the OS 310 of the guest VMs 306-1 and 306-2 and of the security-VM 304, includes a virtual network interface card (vNIC) 416 which is a programmatic interface of the VM for communicating with the vSwitches 314 of the virtualization platform 302. All packet traffic between a guest VM 306-*i* and the external network 320 passes through the vNIC 416 of the VM and the associated networking driver 318-*i*.

In addition to a regular vNIC 416, the OS 310 of the security-VM 304 includes a programmatic interface to the internal vSwitch* 316 through a special vNIC prime (vNIC*) 418. The internal vSwitch* 316 is coupled over linkages 420 with each of the networking drivers 318-*i*, including the ND-1 (318-1) that is associated with the unmodified guest VM 306-1.

Functions of the security-VM 304 include:
1. Receiving a notification from the hypervisor 312 when a guest VM 306-*i* is booted;
2. Determining the security configuration of the guest VM 306-*i*;
3. Configuring and linking an associated networking driver 318-*i*;
4. Configuring and assigning an associated virtual security agent 412 in the security application 322;
5. Enable "fast-path" processing through the fast-path driver 324 of the associated networking driver 318-*i*; and
6. Enable "slow-path" processing through the slow-path engine 326 in the associated virtual security agent 412 if required, i.e. if the security configuration the guest VM 306-*i* indicates that for example a security agent is not provided in the guest VM 306-*i*.

As shown in FIG. 4, the networking driver 318-1 is associated with the unmodified guest VM 306-1 and will be linked (registered) with the associated virtual security agent 412 to operate in the "slow-path" mode, that is: to pass packet traffic over the linkage 420 through the vSwitch* 316 and the vNIC* 418, to the associated virtual security agent 412 which provides packet inspection using the FilterLib software library 414. Shown in a dotted line, the networking driver 318-1 may also directly access the FilterLib software library 414. Each networking driver 318 further includes a firewall (FW) 422 for basic packet filtering based on information in the packet headers, i.e. source and destination address as well as port numbers.

In the case of the pre-configured VM 306-2, packet inspection and filtering is provided by the inspection engine 408 under control of the security agent 406, both of which reside in the pre-configured VM 306-2. In this case, the security-VM 304 configures the associated networking driver 318-2 in a fast-path mode, that is to pass all packet traffic with minimum filtering. By using the fast-path driver 324, higher efficiency may be obtained while the security-VM 304 is still in control and is able to intervene in the event that the pre-configured VM 306-2 is mis-behaving.

In the embodiments of the invention described above, the secure virtual server system 300 comprises a processor, and a computer readable storage medium, e.g., computer memory, CD-ROM, DVD, floppy or other storage medium, having computer readable instructions stored thereon, which, when executed by the processor, form the virtualization platform 302 including the hypervisor 312; one or more guest virtual machines 306 deployed on top of the virtualization platform 302; a security virtual machine 304 deployed on top of the virtualization platform 302; and one or more networking drivers 318 in the virtualization platform 302 for linking the guest virtual machines 306 to a network 320, and for intercepting data traffic of the guest virtual machines 306 and routing it through the security virtual machine 304. For greater certainly, all components of the virtual server system shown in FIGS. 3 and 4 comprise computer readable storage medium having computer readable instructions stored thereon, which, when executed by the processor, form the above noted components.

A computer readable storage medium is also provided, such as DVD, CD-ROM, floppy, computer readable memory or other medium, which has computer readable instructions stored thereon, which, when executed by a processor, perform the steps of the method described in the following FIGS. 5 and 6.

Figure 5:
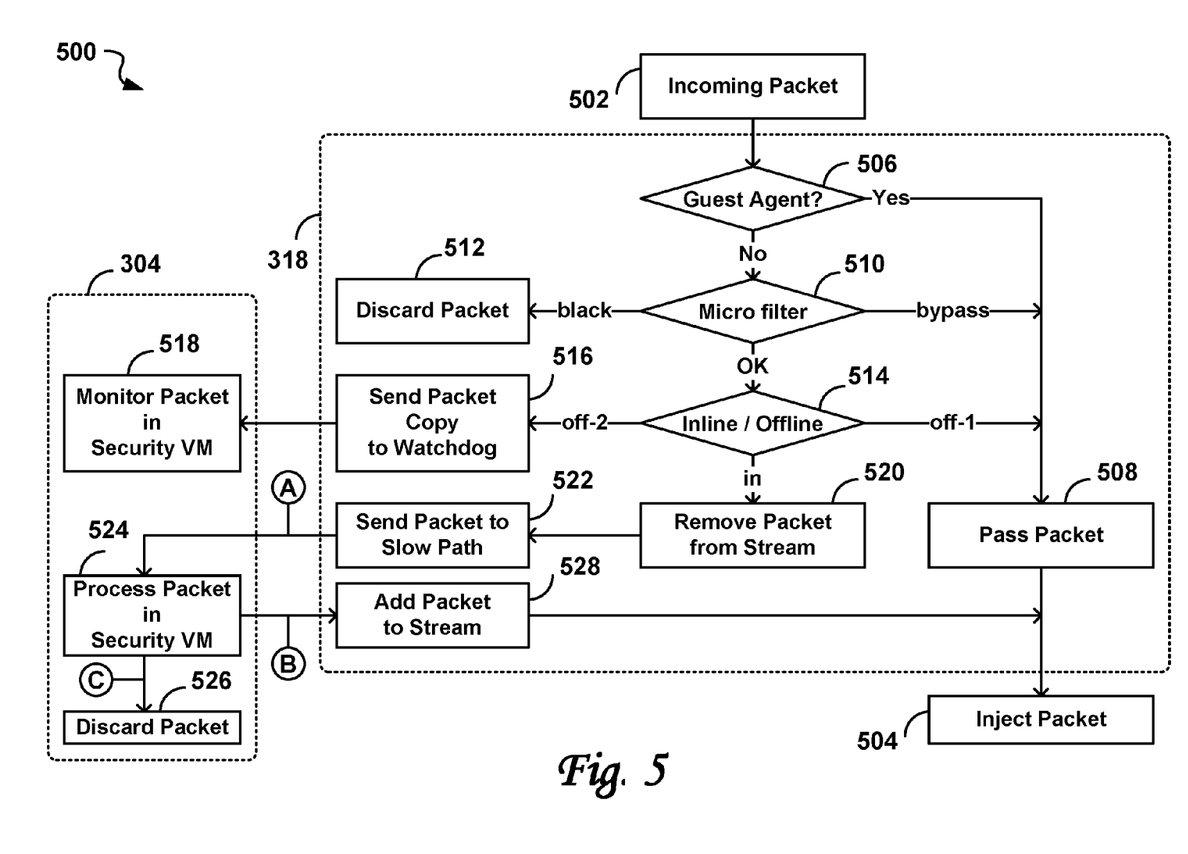
FIG. 5 shows a flowchart 500 illustrating "fast-path" and "slow-path" packet stream processing in the networking driver 318 and the security-VM 304 respectively of the secure virtual server system 300 of FIG. 3.

FIG. 5 shows a flowchart 500 illustrating "fast-path" and "slow-path" packet stream processing in the networking driver 318 and the security-VM 304 respectively. An individual packet of a packet stream between a guest VM 306 and the associated vSwitch 314 (see FIG. 3) is received by the networking driver 318 in a step 502 "Incoming Packet", and may be outputted by the networking driver 318, i.e. injected back into the packet stream, in a step 504 "Inject Packet" unless it is filtered (discarded) in either the "fast-path" or the "slow-path" process. The same packet stream processing procedure applies to a packet stream that flows from the guest VM 306 to the associated vSwitch 314 as well as a packet stream that flows in the opposite direction.

The security-VM 304 monitors the state of the guest VM. If the guest VM 306 is a guest VM that includes a security agent (406) such as the guest VM-2 306-2 (FIG. 4), the security-VM 304 periodically determines whether the security agent 406 is running, and informs the networking driver 318 accordingly.

In a step 506 "Guest Agent Running?", it is determined whether the security agent 406 is installed and running. If the security agent 406 is installed and running (exit "Yes" from the step 506), the packet needs no further inspection and may be passed to the exit in a step 508 "Pass Packet" and injected into the packet stream in the step 504 "Inject Packet".

If the security agent 406 is not installed or not running (exit "No" from the step 506), the packet is processed through a fast filter in a step 510 "Micro filter", in which a quick decision is made on the acceptability of the packet as in a firewall. The step 510 has three possible exits, "blacklist", "bypass", and "OK". The packet is discarded and removed from the packet stream, (exit "blacklist") in a step 512 "Discard Packet" if it matches certain programmable blacklist criteria, e.g. on the basis of protocol, IP address range, and/or port number. The packet is passed (step 508) and injected back into the packet stream (step 504) if the bypass mode is enabled. The purpose of the bypass mode is to provide less per-packet processing, i.e. provide higher efficiency, in cases where intrusion detection and prevention has already occurred for a packet stream. For example traffic between two guest VMs 306 (e.g. VM-1 and VM-2, see FIG. 3) through the same vSwitch 306 needs to be processed in only one of the networking drivers 318 (i.e. ND-1 and ND-2).

If the packet passes the "Micro filter" step 510, i.e. it is not blacklisted and it is not bypassed, a determination is made in a step 514 "Inline/Offline" whether the "slow path" (inline) or the "fast path" (offline) should be taken, based on a state of the networking driver 318. In the "fast path" case ("off-1" exit from the step 514), the packet is passed (step 508) and injected back into the packet stream (step 504). A copy of the packet is also forwarded ("off-2" exit from the step 514) in a step 516 "Send packet copy to watchdog" to the security VM 304 for monitoring. The security VM 304 may monitor the copied packet in a step 518 "Monitor packet in Security VM" for the purpose of statistics or to perform additional packet inspections, and in general perform a watchdog function. Note that the packet stream continues unimpeded through the steps 508 "Pass Packet" while the watchdog function may be performed in parallel.

In the "slow path" case the packet is actually removed from the packet stream in a step 520 "Remove packet from stream" and routed through the security VM 304 before being re-injected back into the packet stream. This is illustrated in FIG. 5 with a step 522 "Send packet to slow path" in which the packet is sent to the security VM 304; a step 524 "Process packet in security VM" in which the packet is filtered and inspected, and where it is possibly discarded in a step 526 "Discard packet"; and a step 528 "Add packet to stream" in which the packet (if it was not discarded in the step 526) is forwarded to the step 504 in the networking driver 318 to be injected back into the packet stream.

Forwarding of packets from the steps 516 and 522 to the steps 518 and 524 respectively, and similarly in the opposite direction from the step 524 to the step 528, may preferably occur in TCP (Transmission Control Protocol) sessions that are established between the networking driver 318 and the security VM 304.

The virtual security agents 412 are equivalent to the security agent 406 that may exist in pre-configured VMs, e.g. the pre-configured VM 306-2. Bundling all virtual security agents 412 used in protecting associated guest VMs 306 (e.g. the unmodified guest VM 306-1) in the security VM 304 to run the "slow-path" function for each associated guest VM 306 as independent processes or threads, has the advantage of robustness and universality. It also provides a design simplification, because the design of the security agent 406 may be reused for the virtual security agents 412, and the design of the inspection engine 408 can be reused for the slow-path engine 326.

In an alternative embodiment of the invention, the "slow-path" process functions may be implemented in modules residing within the virtualization platform 302, which has the advantage of potentially faster operation because the overhead of sending each packet from the networking drivers 318 to the security VM 304 may be avoided. This method relies on special interface hooks (API) in the hypervisor 312, which may not be available in all versions of the virtualization platform 302 that is used.

Figure 6:
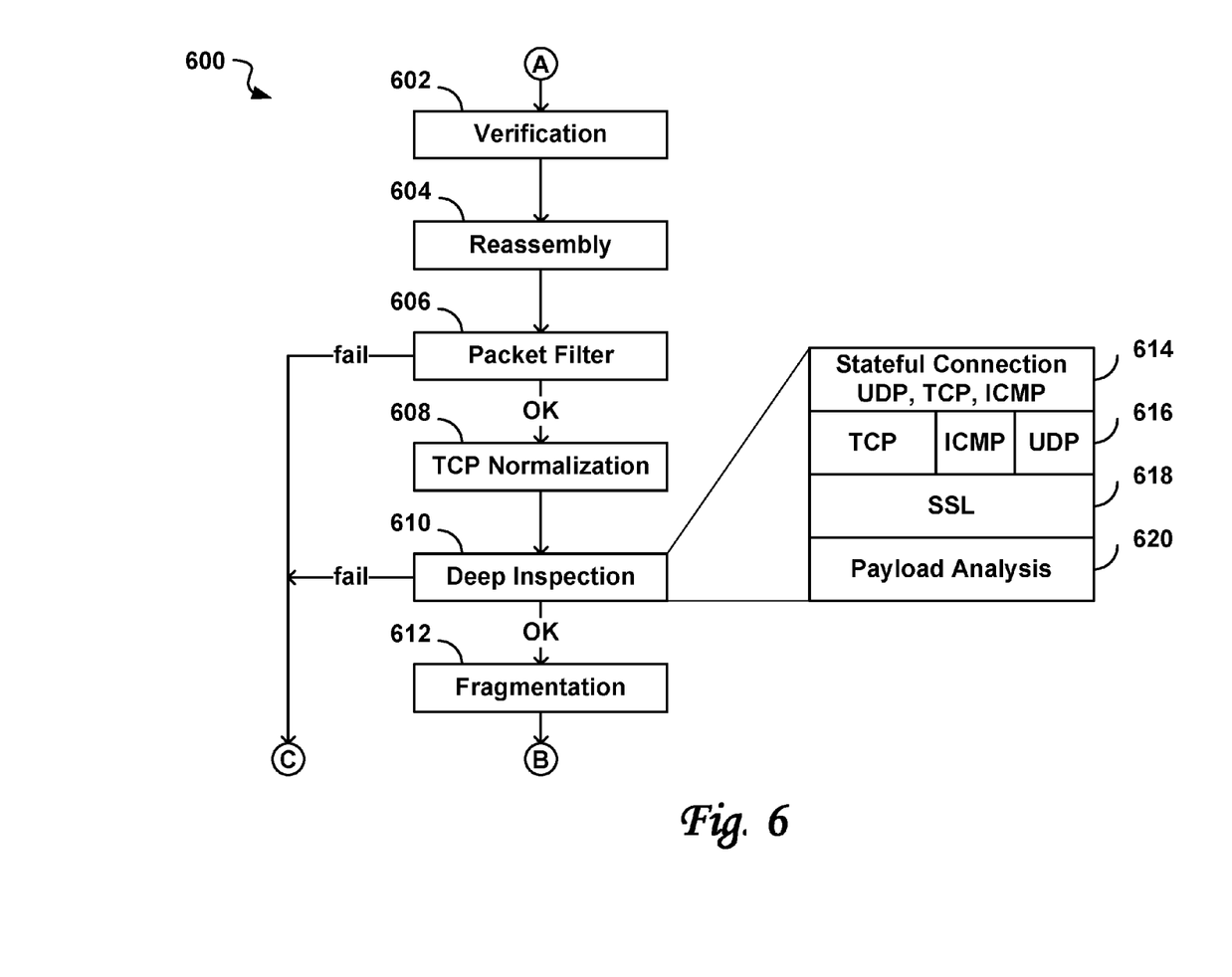
FIG. 6 is a flow chart of "slow path" processing 600, which represents an expansion of the step 524 of the flowchart 500 of FIG. 5.

FIG. 6 is a flow chart of "slow path" processing 600, which represents an expansion of the step 524 "Process packet in security VM" of FIG. 5, including:

a step 602 "Verification";
a step 604 "Reassembly";
a step 606 "Packet Filter";
a step 608 "TCP Normalization";
a step 610 "Deep Inspection"; and
a step 612 "Fragmentation".

Packets arrive from the fast path (flow chart tag "A") in FIG. 5. In the step 602 "Verification", a simple check of packet validity including checksum verification is performed.

In the step 604 "Reassembly", IP packets in the intercepted packet stream that may have been fragmented (e.g. to meet layer 2 protocol constraints) are reassembled. In other words, IP packets may have been fragmented into packet fragments before arriving at the secure virtual server 300, for example, due to limitations of the layer 2 network over which the packet stream was transmitted. Such packets need to be reassembled from the fragments before filtering and deep inspection can be applied.

In the step 606 "Packet Filter" a stateless check of layer 3/4 properties in the header of the packet is performed, in which address and port numbers are compared with programmed lists of acceptable and blacklisted ranges. Failing packets are removed (exit "fail" from the step 606) and discarded in the step 526 of FIG. 5 (flowchart tag "C"). Packets that are not removed (exit "OK") continue, to be processed in the next step 608 "TCP Normalization".

In the step 608 "TCP Normalization", TCP segments that may arrive out of order, are buffered and re-ordered. This is necessary to allow deep inspection to occur in the next step 610.

In the step 610 "Deep Inspection", deep inspection on the packet is performed using facilities of the FilterLib software library 414 (FIG. 4). The "Deep inspection" step 610 is further expanded into successive steps including: stateful connection verification (614), i.e. verifying the correct sequence of packet flags in a connection; a protocol dependent check (e.g. checksum and sequence numbers) for Transmission Control Protocol (TCP), Internet Control Message Protocol (ICMP) and User Datagram Protocol (UDP) protocols (616); decrypting of the SSL layer if it is present (618); and finally a payload analysis in which it is determined if the packet contains any unwanted data, i.e. malware (620). Details of the deep packet inspection techniques used by the present assignee may be found in co-pending patent application Ser. Nos. 11/678,587 filed on Feb. 26, 2007 entitled "Fast Identification of Complex Strings in a Data Stream"; Ser. No. 11/766,976 filed on Jun. 22, 2007 entitled "Method and System for Monitoring Encrypted Data Transmissions"; and Ser. No. 11/955,269 filed on Dec. 12, 2007 "Conditional String Search", Ser. No. 11/491,233 filed on Jul. 24, 2006 entitled "TCP Normalization Agent", all of which are incorporated herein by reference. Packets that fail any of the inspection checks are removed (exit "fail" from the step 610) and discarded in the step 526 of FIG. 5 (flowchart tag "C"). Packets that are not removed (exit "OK") continue, to be processed in the next step 612 "Fragmentation".

In the step 612 "Fragmentation", packets that had been reassembled in the step 604 "Reassembly" are re-fragmented and returned to their original fragmentation state. In other words, a reassembled packet (cf. step 604) is fragmented again before re-inserting it back into the packet stream.

In the step 614, a stateful connection sequence of the packet is verified, based on the protocol sequence specified for packets of a TCP, UDP, or ICMP packet stream by verifying the correct sequence of packet flags.

In the step 616, a protocol dependent check (e.g. correct checksums and sequence numbers in the packet headers) TCP, ICMP and UDP packets are confirmed.

In the step 618 decrypting of the SSL layer is performed so that a clear text of the payload can be inspected. The step 618 is skipped if no SSL layer is present.

Finally, in the step 620 a detailed analysis of the packet payload is performed.

Packets that have survived the complete "slow path" processing step 600 are returned to the security VM 304 (flow chart tag "B") to be added to the packet stream (step 528, FIG. 5).

The coordinated approach to protecting virtualized environments includes the security agent 406 that can be deployed on guest VMs 306, as well as the security VM 304 as illustrated in FIG. 4 above. This architecture ensures that critical assets (certain guest VMs such as the pre-configured VM 306-2) can be protected by deploying software on the asset itself, whereas non critical assets may be deployed without built-in security agent protection, instead they are protected by the security VM 304.

The coordination sequence is as follows:
1. When a guest VM 306 is started, the security VM 304 is notified.
2. If the security VM 304 detects that a security agent 406 is deployed on the guest VM, e.g. the preconfigured VM 306-2, then it validates that the correct software version and security configuration has been deployed; this could require interaction with an overall Security Manager (external to the virtual server itself).
3. The guest VM 306 (e.g. the pre-configured VM 306-2, FIG. 4) is now up to date with the most recent protection, and is allowed to communicate on the network (e.g. the external network 320), with traffic being sent directly from the hypervisor to the guest VM 306-2. Network communication is allowed and bypasses the security VM 304.

But not all virtual machines will have a Security Agent installed. FIG. 4 also shows an unmodified guest VM 306-1. When a guest VM is deployed that does not require a security agent the following sequence occurs:
1. When the guest VM 306 (e.g. the guest VM 306-1) is started, the security CM 304 is notified.
2. If the guest VM 306 does not require installation of a security agent on the guest, the security VM 304 scans the guest configuration and applies appropriate IDS/IPS filtering within the security VM 304 in the form of an associated virtual security agent 412.
3. Data flows through the security VM 304 via VMsafe APIs, essentially a tap on the associated networking driver 318, and IDS/IPS filtering is applied by the associated virtual security agent 412.

Multiple Virtualization Platforms

Although the embodiment of the invention has been described with regard to virtualization platforms based on VSafe software from VMware Inc., it is understood that the techniques described, can be also applied to other virtualization platforms, for example, Microsoft Windows Server Virtualization, Citrix Xen, and Virtual Iron.

It is also understood that a functionally of the security VM 304 on each of these platforms may vary, but the coordination approach for IDS/IPS data inspection described above will still be applicable to each of the virtualization platforms.

Thus, improved methods and a system for intelligent coordination of intrusion prevention in a virtualized environment have been provided.

The IDS/IPS method and system of the embodiment of the invention have an advantage of protecting virtual machines that have a built-in security agent, as well as protecting virtual machines, which do not have a security agent. The advantage of this coordinated architecture is that traffic destined for a guest VM 306 which has an IDS/IPS security agent 406 deployed (e.g. the pre-configured VM 306-2) will not incur any significant delay, being routed directly from the hypervisor to the guest VM 306-2. Traffic for the remaining guest VMs (e.g. the unmodified guest VM 306-1), which do not have a security agent, can be intercepted in the respective associated networking driver (318-1) and processed the security VM 304, and the impact that this central processing has can thus be minimized.

In using the benefits of the embodiments of the present invention, organizations are no longer required to deploy additional security hardware in order to protect their data center computing. The investments they are making in multiprocessor, multi-core architectures and virtualization can also be leveraged to provide security mechanisms to protect these environments. Virtualization allows servers and server-hosted desktops to be protected to a level that exceeds their physical counterparts. These deployments can be protected today and enhanced as introspection capabilities emerge in the virtualization platforms. A coordinated approach of the embodiment of the present invention with security software that can be flexibly deployed as a Security VM in combination with a security agent on guest virtual machines will give organizations the agility necessary to see continued success with their virtualization deployments.

Although the invention has been illustrated with the reference to specific embodiments, it will be apparent to those skilled in the art that various changes and modifications may be made which clearly fall within the scope of the invention. The invention is intended to be protected broadly within the spirit and scope of the appended claims.

The invention claimed is:

1. A method for computer security inspection in a secure virtual server system, the method comprising:
   in a computer having a processor, and a non-transitory computer readable storage medium having computer readable instructions stored thereon for execution by the processor:
      providing a virtualization platform including a hypervisor;
      forming a plurality of guest virtual machines deployed on top of the virtualization platform;
      forming a security virtual machine deployed on top of the virtualization platform, the security virtual machine being configured to determine which of the guest virtual machines have a respective security agent installed and running;
      providing one or more networking drivers for intercepting packet stream of respective guest virtual machines;
      causing each networking driver to:
         provide a fast path driver for passing the packet stream through, provided a respective guest virtual machine has a security agent installed and running on the guest virtual machine; and
         route the packet stream of the respective guest virtual machine through the security virtual machine for packet inspection, provided the respective guest virtual machine does not have a security agent installed and running.

2. The method of claim 1, further comprising inspecting the intercepted packet stream in the virtual security agent.

3. The method of claim 2, wherein the inspecting further comprises verifying validity of a packet of the intercepted packet stream based on a checksum.

4. The method of claim 3, further comprising reassembling the packet from packet fragments in the intercepted packet stream after the verifying the validity.

5. The method of claim 2, wherein the inspecting further comprises verifying the packet based on layer 3 or 4 header information.

6. The method of claim 2, wherein the inspecting further comprises performing a deep inspection of the packet, including inspecting payload.

7. The method of claim 6, wherein the deep inspection further comprises:
   buffering and re-ordering Transmission Control Protocol (TCP) segments;
   verifying a stateful connection sequence of the packet; and
   verifying TCP, User Datagram Protocol (UDP), and Internet Control Message Protocol (ICMP) protocol dependent header fields.

8. The method of claim 7, further comprising:
   decrypting an encrypted payload of the packet; and
   analyzing the decrypted payload to verify that it does not contain unwanted data.

9. The method of claim 8, further comprising discarding the packet, provided it fails any of the steps of verifying the stateful connection, verifying TCP or analyzing the decrypted payload.

10. The method of claim 6, further comprising fragmenting the packet into the packet fragments after the performing the deep inspection of the packet.

11. The method of claim 6, wherein the inspecting further comprises returning the packet to the associated networking driver.

12. The method of claim 1, further comprising pre-configuring the guest virtual machine with the security agent, provided the guest virtual machine has the security agent installed.

13. The method of claim 1, comprising running the virtual security agent in the security virtual machine.

14. The method of claim 1, further comprising discarding packets whose headers contain information that matches with predetermined criteria.

15. The method of claim 1, comprising running the virtual security agent in the virtualization platform.

16. The method of claim 1, further comprising providing the networking driver having a firewall.

17. The method of claim 1, further comprising providing a plurality of security agents for the security virtual machine, for performing intrusion-detection or intrusion-prevention inspection of the intercepted packet stream, each security agent corresponding to a respective guest virtual machine.

18. The method of claim 17, further comprising linking the respective guest virtual machine to a network and intercepting packet stream of the respective guest virtual machine.

19. The method of claim 1, further comprising routing the intercepted packet stream through a respective virtual security agent in the security virtual machine outside of the respective guest virtual machine.

20. The method of claim 1, further comprising performing intrusion-detection or intrusion-prevention inspection of the intercepted packet stream by the virtual security agents.

* * * * *